United States Patent [19]
Jayashankar et al.

[11] Patent Number: 5,454,999
[45] Date of Patent: Oct. 3, 1995

[54] COMPOSITE SILICIDE/SILICON CARBIDE MECHANICAL ALLOY

[75] Inventors: S. Jayashankar; Michael J. Kaufman, both of Gainesville, Fla.

[73] Assignee: University of Florida, Gainesville, Fla.

[21] Appl. No.: 69,730

[22] Filed: Jun. 1, 1993

[51] Int. Cl.$^6$ ............................. B22F 3/16; C22C 29/02
[52] U.S. Cl. ........................... 419/32; 419/38; 75/230; 75/236; 428/570
[58] Field of Search ................ 75/230, 236; 419/32, 419/38; 428/578

[56] References Cited

U.S. PATENT DOCUMENTS

| | | | |
|---|---|---|---|
| 4,927,792 | 5/1990 | Petrovic et al. | 501/92 |
| 4,970,179 | 11/1990 | Petrovic et al. | 501/92 |
| 5,000,896 | 3/1991 | Petrovic et al. | 264/86 |
| 5,069,841 | 12/1991 | Petrovic et al. | 264/86 |

OTHER PUBLICATIONS

*J. Mater. Res.*, vol. 8, No. 6, Jayashankar et al, "Tailored MoSi$_2$/SiC Composites By Mechanical Alloying," p. 1428 (after Jun. 1, 1993).
*J. Am. Ceram. Soc.*, vol. 74, Maloy et al, "Carbon Additions To Molybdenum Disilicide: Improved High–Temperature Mechanical Properties," p. 2704 (1991).
*Scripta Metall.*, vol. 27, Hardwick et al, "Reaction Synthesis of MoSi$_2$ from High Purity Elemental Powders," p. 391 (1992).
*Mater. Sci. Eng.*, vol. A155, Schwarz et al, "Synthesis Of Molybdenum Disilicide By Mechanical Alloying," p. 75 (1992).
*Scripta Metall.*, vol. 26, Jayashankar et al, "In–Situ Reinforced MoSi$_2$ Composites By Mechanical Alloying," p. 1245 (1992).
Waldron, et al. "Sintering" pp. 60–64, 1978.
Dixon et al. "Powder Metallurgy for Engineers", pp. 10–13, 1971.

*Primary Examiner*—Donald P. Walsh
*Assistant Examiner*—Daniel Jenkins
*Attorney, Agent, or Firm*—Kerkam, Stowell, Kondracki & Clarke

[57] ABSTRACT

A method of producing a composite powder by providing particles of, e.g., molybdenum, silicon and carbon, in a proportion relative to each other so as to possess an overall chemical composition in that segment of the ternary diagram of FIG. 1 designated A, and subjecting the particles to a mechanical alloying process under conditions and for a time sufficient to produce the composite powder. Also disclosed is a method of forming a substantially silica-free composition of matter comprising a matrix substance of MoSi$_2$ having SiC dispersed therein, the method comprising consolidating the above-described composite powder. Also disclosed is a method of forming oxidation- and wear-resistant coatings by subjecting the composite powder whose composition lies in segment A to a metallurgical process such as plasma spraying. A method of forming a composite material of uniformly dispersed particles of silicon carbide in a silicide or an alloy silicide matrix, particularly molybdenum disilicide, is also disclosed. The matrix contains alloy silicides such as (Mo,W)Si$_2$. The volume fraction of the silicon carbide may be varied from 10–90%. A method is also disclosed for producing hybrid composites consisting of a third phase of fibers or whiskers dispersed among a silicide/silicon carbide two-phase microstructure derived from the composite powder.

12 Claims, 2 Drawing Sheets

COMPOSITE SILICIDE/SILICON CARBIDE MECHANICAL ALLOY

Research leading to the completion and reduction to practice of the invention was supported, in part, by the Defense Advanced Research Projects Agency, Office of Naval Research, Department of Defense, Grant Nos. MDA972-88-J-1006 and N00014-91-J-4075. The United States Government has certain rights in and to the claimed invention.

BACKGROUND OF THE INVENTION

1. Field of the Invention

The present invention relates to silicide/silicon carbide composites and articles of manufacture based thereon.

2. Discussion of the Prior Art

Silicides of transition metals such as molybdenum disilicide ($MoSi_2$) and composites comprising matrices of the transition metal silicide reinforced with silicon carbide (SiC) are considered valuable materials for high-temperature structural applications due to their high melting point, excellent oxidation and corrosion resistance, low density and good electrical and thermal conductivity properties. Similar to many other high-temperature intermetallics, the use of $MoSi_2$ is limited as a structural material due to its low ambient temperature fracture toughness and poor elevated temperature strength.

A number of approaches for the processing of this intermetallic are unsuitable due to its high melting point and owing to the fact that it exists as a line compound. Furthermore, the relatively high dissociation pressures of silicides such as $MoSi_2$ at elevated temperatures result in uncontrolled second phase formation due to silicon volatilization [T. G. Chart, Metal Science, Vol. 8, p. 344 (1974); and Searcy et al, J. Phys. Chem., Vol. 64, p. 1539 (1960)]. In view of these characteristics, powder processing has been the preferred fabrication route due to the lower processing temperatures that it affords; unfortunately, it also results in the incorporation of silica (originally formed as a surface layer on the powder particles [Berkowitz-Mattuck et al, Trans. Metall. Soc. AIME, Vol. 233, p. 1093 (1965)]) into the consolidated samples. The presence of grain boundary silica either as a continuous film or as discrete particles is detrimental since the particles may serve as crack nucleation sites at lower temperatures, while enhancing deformation via grain boundary sliding at temperatures about 1,200° C. where the silica softens appreciably. In fact, recent studies have shown that low silica polycrystalline $MoSi_2$ demonstrates negligible "plasticity" below 1,400° C. [Aikin, Jr., Scripta Metall., Vol. 26, pp. 1025–1030 (1992)]. Silica formation also alters the matrix stoichiometry and results in the formation of $Mo_5Si_3$. Such stoichiometric deviations degrade the intermediate temperature oxidation resistance [Meschter, Metall. Trans., Vol. 23A, pp. 1763–1772 (1992)] of the silicide. Finally, silica has also been reported to cause the degradation of the diffusion barrier coatings at the fiber-matrix interface in ductile fiber-reinforced $MoSi_2$ [Xiao et al, Mater. Sci. Eng., Vol. A155, p. 135 (1992)].

In attempting to control the oxygen content of $MoSi_2$ by varying the starting powder size and by intentional carbon additions (deoxidant), Maxwell [NACA RM E52B06 (1952)] found that a fine-grained material with carbon additions had better creep properties and lower high-temperature plasticity than a similar grain-size material without carbon. More recently, Maloy et al [J. Am. Ceram. Soc., Vol. 74, p. 2704 (1991)] also reported improved elevated temperature fracture toughness with varying levels of carbon additions. However, substantial (~40%) weight losses were reported on consolidating these samples, resulting in formation of Mo-rich second phases. Hardwick et al [Scripta Metall., Vol. 27, p. 391 (1992)] attempted to process oxygen-free $MoSi_2$ by conducting all the powder handling and consolidation steps under vacuum or inert gas atmospheres. However, these approaches [Hardwick et al, supra; and Schwarz et al, Mater. Sci. Eng., Vol. A155, p. 75 (1992)] are impractical from the standpoint of processing bulk structural parts due to the difficulties involved in the scale-up of the evacuation systems, as well as the excessive costs that would be associated with such processes.

Other methods for forming $MoSi_2$/SiC composites are described in U.S. Pat. Nos. 4,927,792 and 5,000,896.

Methods for the production of alloy silicide/SiC composites are described in U.S. Pat. Nos. 4,970,179 and 5,069,841.

It is, therefore, clear that further enhancements in the properties of $MoSi_2$ and $MoSi_2$ alloy silicide based composites are possible only with the elimination of silica (and oxygen) in the matrix, along with close control of the overall stoichiometry, through the use of simple and economical processing schemes that do not necessitate elaborate care during powder handling.

It is an object of the present invention to provide novel, substantially silica-free, silicide/SiC composites such as $MoSi_2$/SiC, methods for their production and articles of manufacture derived therefrom which are not subject to the above-noted disadvantages.

It is another object of the invention to form a composite material of uniformly dispersed particles of silicon carbide in a silicide or an alloy silicide matrix, particularly molybdenum disilicide. The matrix contains alloy silicides such as $(Mo,W)Si_2$. The volume fraction of the silicon carbide can be varied from 10% to 90%.

It is also an object of the invention to provide enhanced high-temperature properties to silicide matrices, especially above the softening temperature of the silica, through the elimination of the siliceous intergranular phase and its conversion to stable silicon carbide through in situ carbothermal reduction reactions.

SUMMARY OF THE INVENTION

The above and other objects are realized by the present invention, one embodiment of which relates to a method for producing a composite powder by providing particles of a transition metal such as molybdenum, silicon and carbon in a proportion relative to each other so as to possess an overall chemical composition in that segment of the ternary diagram of FIG. 1 designated A, and subjecting the particles to a mechanical alloying process under conditions and for a time sufficient to produce the composite powder.

Another embodiment of the invention comprises a composite mechanical alloy powder having a composition in that segment of the ternary diagram of FIG. 1 designated A.

An additional embodiment of the invention comprises a method of forming a substantially silica-free composition of matter comprising a matrix substance of $MoSi_2$ having SiC dispersed therein, the method comprising consolidating the composite powder described above.

Yet another embodiment of the invention relates to the composition of matter formed by the above-described consolidation method.

A further embodiment of the invention concerns articles of manufacture comprising the above-described consolidated composition of matter.

A still further embodiment of the invention comprises a method of forming oxidation- and wear-resistant coatings by subjecting the composite powder whose composition lies in segment A to a metallurgical process such as plasma spraying.

Yet an additional embodiment of the invention relates to a method of producing hybrid composites consisting of a third phase (preferably fibers or whiskers) dispersed among a silicide/silicon carbide two-phase microstructure derived from the composite powder.

DETAILED DESCRIPTION OF THE INVENTION

Figure 1:
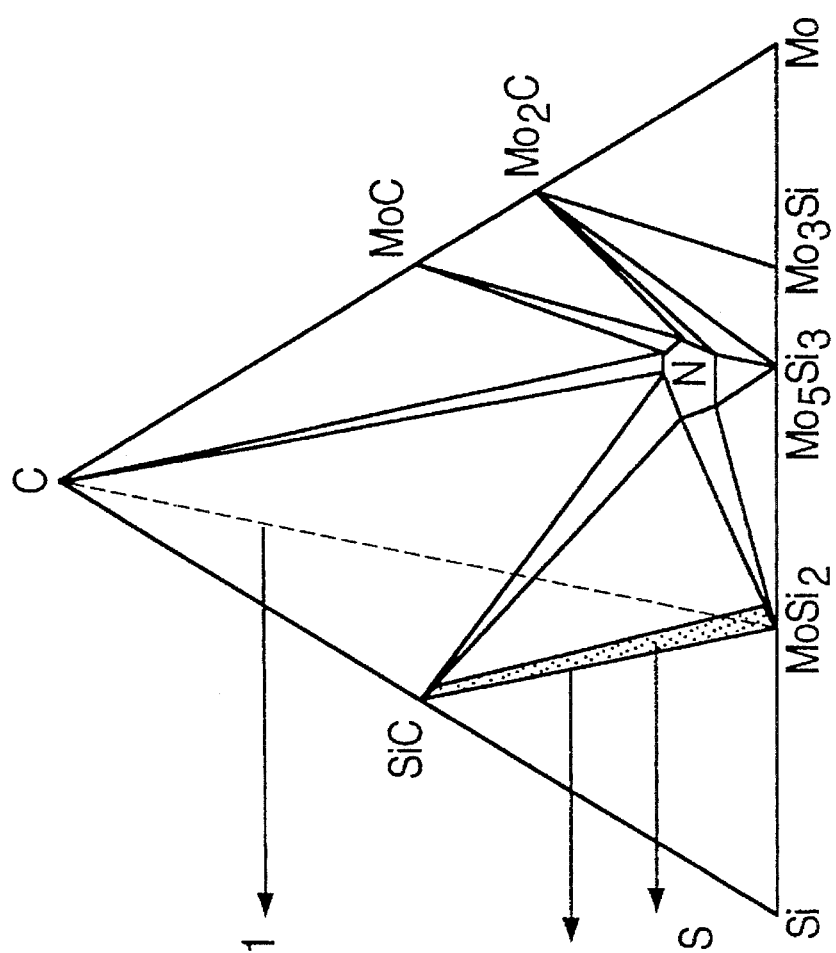
FIG. 1 is a ternary diagram of Mo—Si—C compositions.
Figure 2A:
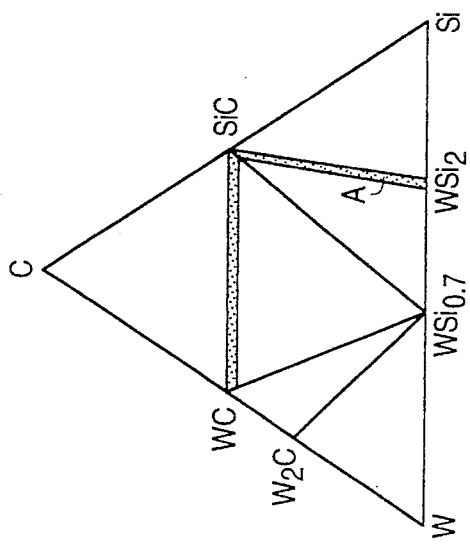
FIGS. 2(a), 2(b), 2(c) and 2(d) show prior art ternary isotherms of W—Si—C, Nb—Si—C, Zr—Si—C and Ti—Si—C, respectively.
Figure 2B:
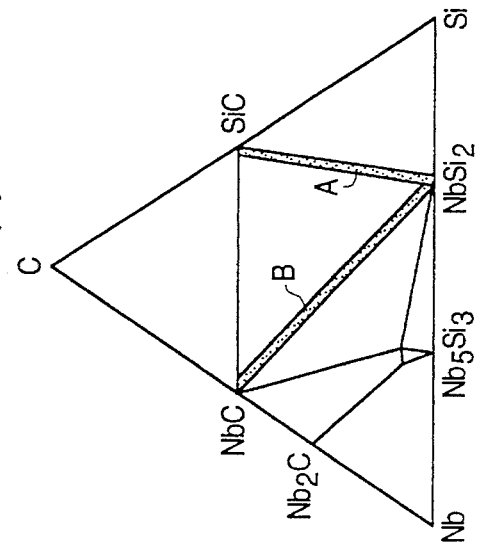
Figure 2C:
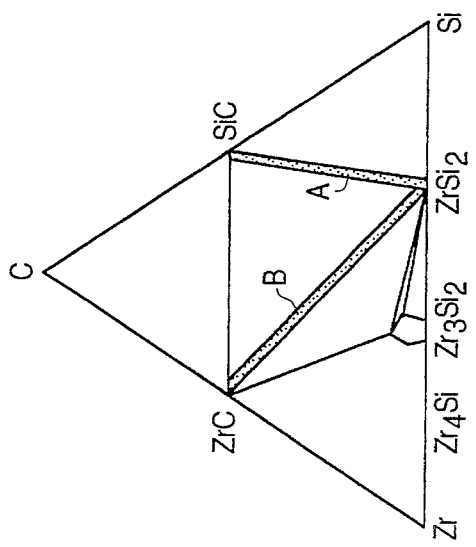
Figure 2D:
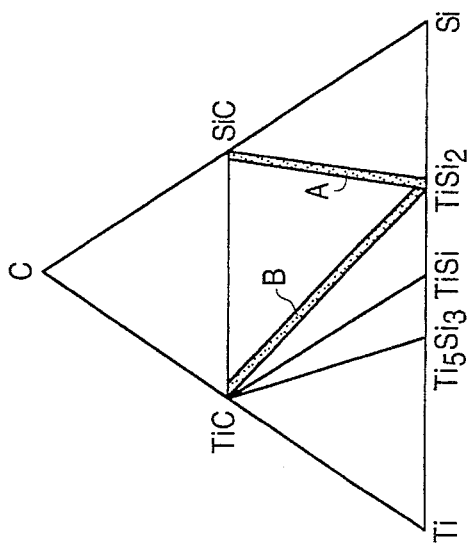

The present invention is predicated on the discovery that a novel composite body comprising a transition metal silicide, e.g., $MoSi_2$ and SiC, having enhanced strength properties and a wide variety of applications, all unshared by such composites prepared according to prior art methods, can be produced substantially silica-free by mechanically alloying pure powders of molybdenum, silicon and carbon and subsequently consolidating or processing them such that $MoSi_2$ and SiC are formed in situ. Advantage is taken of a simultaneously on-going carbothermal reduction reaction whereby any silica is reduced to silicon carbide. The mechanically alloyed composite powders are capable of being consolidated, for example, by a host of powder metallurgical techniques to produce SiC-reinforced $MoSi_2$ articles having heretofore unattainable high-temperature structural properties. The mechanically alloyed powders can also be subjected to processes such as plasma spraying in order to provide coatings of $MoSi_2$ and SiC on the desired articles. The proportion of the $MoSi_2$ and SiC on these coatings can be varied by varying the composition of the mechanically alloyed powder along segment A.

Throughout the specification and in the appended claims, the following terms have the meanings and definitions set forth hereinbelow:

"Composite" is used herein to denote man-made materials in which two or more constituents are combined to create a material having properties different than those of either constituent. One type of composite identified herein is a composite powder which consists of a physical mixture of two or more constituent powders formed due to mechanical alloying. Another type of composite is, e.g., a binary or ternary (or higher) matrix composite which consists of a matrix material, e.g., $MoSi_2$, and a reinforcement material, e.g., SiC, distributed in and bound together by the matrix.

"Mechanical alloying" as used herein refers to the well known high-energy attrition process whereby atomic scale mixing of elements occurs under conditions of high impact between the particles such that cold welding of the elements occurs to produce a particulate alloy of the elements. The high attrition energies are preferably achieved in a ball milling system.

The term "substantially silica-free" is intended to refer to composites containing less than about 1% by weight of $SiO_2$.

"Consolidating" as used herein is intended to refer to any of the well known techniques for converting powdered materials to dense, self-supporting, composite articles. The term embraces, but is not limited to, sintering, hot-pressing, extrusion, hot-forging, hot-rolling, swaging or any other applicable powder metallurgical technique.

The mechanical alloying process consists of the repeated welding, fracturing and re-welding of the powder particles in a high energy ball mill. Alloying is effected by the ball particle collisions in several stages. The progress of alloying can be studied in detail by following the microstructural changes by X-ray diffraction, transmission electron microscopy and scanning electron microscopy.

The powder size gets finer through the passage of time through the mechanical alloying process and the final powder size is typically less than 1 micron. The composition of the individual powder particles also converges to that of the blend composition. The final stage of the mechanical alloying process is a steady state process.

The mechanical alloying process may be carried out in small shaker mills such as the Spex mill for processing a few grams of powder, or in a high energy mill such as the Szegvari attritor (0.5 kg to 100 kg of powder). For the processing of larger batches of powder (up to 2,000 kg), it is more convenient to use conventional ball mills that may rotate around a central horizontal axis. The ball mill approach can achieve high energy conditions by ensuring a large diameter of the mill (at least 0.5 m, and preferably over 2.5 m) and rotation below a certain critical speed [see U.S. Pat. No. 4,627,959]. The scaling-up from one process to the next is not direct and the process parameters for the different systems are not known to be related.

Mechanical alloying of the constituent elements results in the formation of a microstructurally uniform and compositionally homogeneous alloy of the desired stoichiometry and the carbothermal reduction process utilizes the reducing properties of carbon to convert silica to silicon carbide. In addition, mechanical alloying enables the homogeneous dispersion of carbon throughout the matrix to facilitate these reactions.

The particle sizes of elemental powders of Mo, Si and C to be mechanically alloyed may range from about 1 μm to about 100 μm, although the range of the starting particle size will not limit the scope of the process. In general, it is to be recognized that smaller particle sizes lead to higher surface area per unit mass of the particles and, therefore, to increased possibilities of contamination.

The initial composition of the Mo—Si—C powder is chosen to form a composite alloy close to the $MoSi_2$/SiC tie line of FIG. 1, but which is slightly molybdenum-rich, i.e., lying in segment A of the diagram. Thus, composites having varying volume fractions of SiC can be formed according to the method of the invention.

Elemental powders in the desired proportion are introduced into a conventional water-cooled planetary attritor employed in conventional mechanical alloying processes and the mechanical alloying is carried out using hardened steel milling media, preferably under a slight over-pressure of titanium-gettered argon or any other medium suitable for excluding oxygen.

The mechanical alloying process is continued until such time that further milling or alloying does not alter the structural characteristics of the powder. Generally, it should correspond to the state where the elements are distributed in a homogeneous manner throughout the mechanically alloyed composite powder.

The time for the mechanical alloying process is not a unique or constant processing parameter, but is rather dependent on a host of conditions such as the type of mill (Spex versus Szegvari), the ratio between the milling media and the powder charge, the size of the mill, the type of the elemental powders to be milled, etc. The process parameters of the different systems are not known to be related and determination of the processing conditions such as the time for complete alloying is accomplished by following the progress of the mechanical alloying process through such techniques as X-ray diffraction, scanning and transmission electron microscopy.

The choice of the milling media or the milling container need not be limited to hardened steel alone. Wear-resistant ceramic media such as tungsten carbide may also be employed as both the milling media and liners for the attrition mill. A major consideration governing the choice of milling media is the contamination resulting from wear and abrasion during the milling process. This dictates the choice of the milling media.

The mechanical alloying process can alternatively be carried out in small shaker mills such as the Spex mill for processing a few grams of the powder, or in high energy mills such as the Szegvari attritor (0.5 kg to 100 kg of powder). For the processing of larger batches of powder (up to 2,000 kg), conventional ball mills with high energy capacity may also be employed.

The particle size of composite alloy powder produced by the mechanical alloying process will depend, of course, upon the conditions and duration of the attrition-MA process. Generally, however, the product will have a particle size in the range of from about 0.01 μm to about 50 μm, and preferably from about 0.1 μm to about 5 μm.

Ternary isotherms of the Mo—Si—C system, as shown in FIG. 1, were constructed by Nowotny et al [Monatsh. fur Chemie, Vol. 85, p. 255 (1954)] at 1,600° C. and by Brewer et al [J. Electrochem. Soc., Vol. 103, p. 38 (1956)] at around 1,727° C. Subsequently, Van Loo et al [High Temp. High Press., Vol. 14, p. 25 (1982)] constructed a 1,200° C. isotherm after examining arc-melted alloys and diffusion couples. The only ternary phase in the Mo—Si—C system is the "Nowotny phase" which has the approximate formula $C_{<1}Mo_{<5}Si_3$ and a relatively wide homogeneity range [Nowotny et al, supra; Parthe et al, Acta Crystallogr., Vol. 19, p. 1030 (1965); Brewer et al, supra; and Van Loo et al, supra]. Minor additions of carbon to $Mo_5Si_3$ destabilize its tetragonal structure and result in the formation of a carbon-stabilized hexagonal Nowotny phase. These Nowotny phases have the general formula $T^1{}_3T^{11}{}_{<2}M_3X_{<1}$ where T denotes a transition metal, M represents Ge or Si, and X denotes a non-metal such as C, O, B or N [Parthe et al, supra]. The presence of carbon-centered tetrahedra is characteristic of the Nowotny phases and accounts for their stability. While the isotherms of Nowotny et al and Brewer et al are in good agreement with each other in their prediction of the existence of a three-phase field between $MoSi_2$, $C_{<1}Mo_{<5}Si_3$ and SiC, the results of Van Loo indicate the co-existence of $Mo_5Si_3$, SiC and $C_{<1}Mo_{<5}Si_3$ at 1,200° C. Recently, it has been postulated by Costa e Silva et al [submitted to Metall. Trans., 1993] that the Van Loo and Brewer diagrams are consistent with each other only if a Class II, four-phase reaction ($MoSi_2$+Nowotny→SiC+$Mo_5Si_3$) exists between the temperatures at which these isotherms were constructed, i.e., 1,200° C. and 1,727° C.

Based on the 1,600° C. isotherm of Nowotny and the 1,727° C. isotherm of Brewer, it is clear that ternary powder alloys within the composition limits established by the $MoSi_2+C_{<1}Mo_{<5}Si_3+SiC$ three-phase field should form a thermally stable, three-phase microstructure when consolidated at these temperatures, provided that the powders are sufficiently homogeneous to minimize the diffusion length scales so as to establish equilibrium within the short time frames of the consolidation process. Here it is assumed that the nature of the isotherms is unaltered by the presence of small amounts of oxygen present as surface $SiO_2$ on the powders. While part of the carbon would take part in the deoxidation/carbothermal reduction reactions, the unreacted residual carbon would exist in equilibrium, as dictated by the isotherm.

For the formation of $MoSi_2$/SiC composites with a minimal amount of the Nowotny phase, it is necessary to start with nominal compositions slightly to the Mo-rich side (i.e., segment A of FIG. 1) of the $MoSi_2$/SiC tie line to restrict the compositional variations (carbon and silicon losses) due to the carbothermal reduction reactions do not shift the overall composition to the adjacent $Si+SiC+MoSi_2$ field where the silicon would experience incipient melting and thus result in the degradation of the high-temperature mechanical properties. Bearing this in mind, it is possible to vary the amount of the reinforcing SiC phase in the $MoSi_2$ matrix by simply choosing compositions at various points along the tie line. Note that the formation of the thermodynamically expected microstructure may also be limited by various kinetic constraints. Similarly, processing-related effects such as porosity can also be appropriately controlled in view of the gaseous by-products formed as a result of the carbothermal reduction reaction.

The primary aim of the present invention is to form low oxygen (low silica) content composites comprised of silicides and silicon carbide. To attain this objective, use is made of the carbothermal reduction reaction in order to reduce the silica to silicon carbide. Carbon, the essential element necessary to deoxidize the matrix, is incorporated through mechanical alloying. Mechanical alloying is a high energy attrition process where atomic scale mixing of the elements occurs.

The processing of oxygen-free $MoSi_2$ by carbon additions requires the following two considerations:

(1) Elimination of the $SiO_2$ through its conversion to SiC. The overall reaction can be written as:

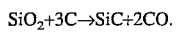

$$SiO_2+3C\rightarrow SiC+2CO.$$

The thermodynamics of this reaction indicate that it is feasible above 1,450° C. In order for the above deoxidation reaction to proceed in the forward direction (SiC formation), the gaseous by-products (for example, CO) of the reaction must be removed. If this is not accomplished properly, considerable amounts of entrapped porosity would develop in the compact. This necessitates the use of vacuum levels of better than $10^{-2}$ Torr in order to evacuate the product gases from the compact. The compact should also have sufficient open porosity prior to and during the deoxidation reaction so that the product gases are evacuated easily from regions such as the core of the compact. However, upon completion of the deoxidation, all porosity (both open and closed) should be minimized or eliminated.

(2) Prevention of silicon volatilization. One of the peculiar characteristics of the silicide bodies (especially at temperatures above 1,550° C.) is that they dissociate to form silicon vapor at pressures below half an atmosphere. Furthermore, the tendency for dissociation increases with an increase in the temperature. Thus, conditions typically present during consolidation such as low vacuum levels (and temperatures above 1,550° C.) would result in the progressive evaporation and loss of the elemental silicon from the silicide body in the form of silicon vapor. The final body would then not contain the desired microstructure (a mixture of silicon carbide and the disilicide), but would have considerable amounts of undesirable phases containing lesser amounts of silicon. It is, however, possible to avoid such silicon losses by maintaining an over-pressure of argon greater than the dissociation pressure.

From the above considerations, it may be seen that maintaining a constant vacuum atmosphere or a constant argon (over-pressure) atmosphere for the duration of the hot consolidation operation of the alloyed Mo—Si—C powder will not yield the desired microstructures due to the conflicting requirements of the deoxidation and silicon volatilization reactions. Maintaining a constant vacuum level of better than $10^{-3}$ Torr, while efficiently removing the entrapped gases at lower temperatures, also leads to silicon volatilization at temperatures above 1,550° C. On the other hand, maintaining a constant argon over-pressure, while eliminating the silicon volatilization, results in incomplete deoxidation and substantial sample porosity.

To achieve the optimum microstructure, the present process is carried out in two stages. The powder is initially loaded in the dies and very low pressure (less than 10 MPa) is applied on the cold compact so that the sample has sufficient open porosity. The sample temperature is ramped to 1,350° C. to 1,500° C. and held at such temperature for 30 minutes under a vacuum of better than $10^{-2}$ Torr in order to deoxidize the matrix. The sample is subsequently heated to 1,600° C. to 1,750° C. under an argon over-pressure and densified for 1 hour at such temperature under a pressure of 20–40 MPa. Subsequently, the pressure on the compact is released and the sample is cooled at 5° C. per minute to room temperature. Furthermore, the uniform dispersion of carbon in the mechanically alloyed powder also ensures the uniform dispersion of the silicon carbide formed as a result of the carbothermal reduction reactions and the cooperative displacement reactions. The powder formed as a result of the mechanically alloying process is very fine (less than 1 micron). As known by those skilled in the art, the use of such fine powders aids in the densification of materials.

It should be noted that the deoxidation of commercial $MoSi_2$ by carbon additions without a commensurate increase in the silicon content [Maxwell, supra; and Maloy et al, supra] would result in compositional shifts along an imaginary line between $MoSi_2$ and C and a corresponding increase in the amount of the Nowotny phase according to the diagrams by Nowotny and Brewer (FIG. 1).

It is possible, according to the present invention, to produce hybrid composites consisting of a third phase dispersed among a silicide/silicon carbide two-phase microstructure derived from the composite powder. The third phase may be a ductile phase such as a refractory metal or it may be a brittle phase having excellent high-temperature properties, i.e., graphite, SiC, $TiB_2$, $Al_2O_3$, TiC, boron, etc. Furthermore, this additional or third phase may be in the form of whiskers, laminates, particulates or fibers. When present as fibers, the third phase may be introduced in the form of discontinuous, randomly oriented fibers or as continuous fibers in the form of mesh, screens or a three-dimensional interwoven network. Furthermore, the third phase may be subject to physical or chemical treatment of its surface so as to alter the interfacial characteristics between the third phase and the matrix. In addition, the interfacial layers may also be altered chemically during the production of the composite through in situ reactions.

Referring to FIGS. 2(a), 2(b), 2(c) and 2(d), the ternary isotherms at 1,727° C. of the W—Si—C, Nb—Si—C, Zr—Si—C and Ti—Si—C, systems, respectively, as proposed by Brewer et al, supra, are illustrated. Using the same arguments that were presented for the Mo—Si—C system of FIG. 1, it can be easily seen that the overall powder compositions that are close to the $WSi_2$—SiC, $NbSi_2$—SiC, $ZrSi_2$—SiC and $TiSi_2$—SiC tie lines, but slightly to the left of the tie lines (segment A in FIG. 2) which are produced by mechanical alloying, should result in the in situ synthesis of the respective silicide/silicon carbide composites when subjected to a similar consolidation sequence as described for the Mo—Si—C alloys. The same rationale could be extended for the production of plasma sprayed coatings, as well.

In the case of the alloy silicides, it is well known that the $MoSi_2$—$WSi_2$ system is isomorphous, with $MoSi_2$ and $WSi_2$ possessing the same tetragonal crystal structure and exhibiting unlimited solubility for one another. Such characteristic makes the processing of the $(Mo,W)Si_2$/SiC composites feasible. Not only would it be possible to vary the SiC particulate content in the composite, but also the relative amounts of $MoSi_2$ and $WSi_2$ in the matrix.

Still referring to FIG. 2 and applying the same argument to segment B, it can be clearly seen that composite mechanical alloy powders with the compositions in segment B should form WC/SiC, $NbC/NbSi_2$, $ZrSi_2/ZrC$ and $TiSi_2/TiC$ composites when subject to hot consolidation as indicated hereinabove.

In the following example, two powder compositions were chosen for mechanical alloying (MA). One corresponded to stoichiometric binary $MoSi_2$ as a baseline for comparison, and the other was a ternary alloy in the $MoSi_2+C_{<1}Mo_{<5}Si_3+$ SiC three-phase field according to FIG. 1. It should be noted that the phase evolution sequence, consolidated microstructures and thermogravimetric analysis are unique for this alloy composition and may be different for other compositions.

EXAMPLE 1

The compositions investigated by mechanical alloying in this study were Si—28Mo—14C and Si—33.33Mo (stoichiometric binary $MoSi_2$) (all compositions in atomic percent). Mechanical alloying was performed in a water-cooled Szegvari attrition mill (planetary type) using hardened steel balls as the milling media and a ball-to-charge ratio of 5:1. Elemental powders of commercial purity molybdenum (purity 99.9%, 2–4 μm) and silicon (purity 98%, <44 μm) and high purity carbon powder (99.5% pure, −300 mesh, amorphous) were the starting materials. To minimize oxygen contamination during processing, high purity titanium-gettered argon (oxygen content <4 ppm) under a slightly positive pressure was maintained in the attritor. The progress of MA was monitored by withdrawing small amounts of powder samples from the same attrition batch after 0, 0.5, 7, 17, 29, 40 and 42 hours of milling. The powders were characterized for structure and morphology by SEM and XRD. In addition, powders obtained after 17 and 40 hours of milling were analyzed by TEM. For the TEM analysis, powders were ultrasonically dispersed in acetone, and a small droplet was spread on a holey carbon film. The fine size (<1 μm) of the powders ensured their electron transparency.

Consolidation of the MA binary and ternary powders was carried out by hot pressing under a vacuum of $10^{-2}$ Torr or better in an inductively heated graphite die at both 1,450° C. and 1,600° C. at a pressure of 35 MPa for 1 hour. To prevent cracking of the sample, the pressure was released prior to cooling. Samples for microstructural characterization were diamond-saw cut, ground and polished to a 1 µm diamond finish. Thin foil TEM samples were prepared from the bulk samples following standard procedures of dimpling and argon ion-milling at 4.5 kV. Microstructural analysis of the consolidated samples, as well as the MA powders, was performed using a JEOL JSM 6400 SEM equipped with a Tracor Northern EDS unit with light element detection capabilities and JEOL 200CX and JEOL 4000FX TEM's, the latter equipped with a Princeton Gamma Tech EDS unit with a light element detector.

The transformation characteristics of the MA powders were monitored by differential thermal analysis (DTA) and thermogravimetric analysis (TGA). DTA/TGA was performed under flowing gettered argon (1 cc/min. oxygen content <4 ppm) on a Netzsch STA-409 system with heating/cooling rates of 10° C./min. Errors due to the differing specific heats of the sample and the reference were eliminated by using commercial $MoSi_2$ powder that had been previously calcined under gettered argon at 500° C. as the reference. For more detailed investigations, powders were heated at 10° C./min. under gettered argon above each DTA exotherm, held at that temperature for less than a minute, and rapidly cooled for subsequent analysis. Structural analysis of the powders and the consolidated samples was carried out using a Philips ADP 3720 diffractometer operated at 40 kV and 20 mA with Cu $K_\alpha$ radiation and digital data acquisition over 2Θ ranges of 5°–100°.

A. Powder Microstructure

The development of the powder morphology with increasing milling times was monitored. After 0.5 hour of milling, large particles with a diameter of 5–6 µm were predominant. Refinement of the powder continued through 7 hours of milling, beyond which the reduction in powder size was gradual.

The powder size stabilized around 1 µm after 29 hours and remained constant thereafter.

Structural evolution studies of the powders as a function of milling time indicated the formation of traces of $\beta$-$MoSi_2$ (hexagonal form) after short milling times [0.5 hour]. Further milling [7 hours] results in a slight increase in the amount of $\beta$-$MoSi_2$, along with the gradual appearance of $\alpha$-$MoSi_2$ (tetragonal form). Further increases in the amount of $\alpha$-$MoSi_2$ continue through 17 hours of milling, at which time elemental molybdenum and silicon are still present. Milling beyond 17 hours through 29 hours results in the almost complete disappearance of the silicon peaks, along with a considerable broadening of the $\alpha$-$MoSi_2$ peaks; this is presumably due to the decrease in the crystallite size of $\alpha$-$MoSi_2$ rather than the effect of lattice strain since $MoSi_2$ is brittle at the milling temperatures. This was confirmed by TEM observations. Beyond 29 hours, milling has little effect on the structure of the powders, a fact which was also corroborated by the SEM observations which showed particle size stabilization after 29 hours.

Powders were characterized for their microstructure by TEM. A dark-field TEM micrograph of a MA $MoSi_2$ powder particle milled for 40 hours reveals a fine distribution of crystallites, the sizes of which are between 4 and 7 nm. In addition, the surfaces of the powder particles appear to be covered with a layer of amorphous oxide, the projected thickness of which varies from 5 to 15 nm. The selected area diffraction pattern (SADP) from this powder indexes to the interplanar spacings of Mo and $\alpha$-$MoSi_2$. X-ray diffractograms from these powders not only confirm the presence of the predominant phases (Mo and $\alpha$-$MoSi_2$) determined in the SADP's, but also reveal traces of the metastable $\beta$-$MoSi_2$ which reportedly occurs only above 1,900° C. under equilibrium conditions. The formation of the $\beta$-$MoSi_2$ at lower temperatures is not surprising and has been reported during the annealing of amorphous Mo—Si multilayers prepared by sputtering [Loopstra et al, J. Appl. Phys., Vol. 63, p. 4960 (1988); and Doland et al, J. Mater. Res., Vol. 5, p. 2854 (1990)], as well as in ion-implanted $MoSi_2$ films [d'Heurle et al, J. Appl. Phys., Vol. 51, p. 5976 (1980)]. The presence of Mo and $MoSi_2$ in the as-milled powders suggests that silicon is dissolved in the $MoSi_2$ and Mo crystallites; this is also a metastable effect caused by mechanical alloying, since the terminal solubilities of Si in Mo and $MoSi_2$ are negligible at room temperature, although both Mo and $MoSi_2$ are known to exist over a certain homogeneity range above ~1,500° C. [Atomic Energy Review, Special Issue No. 7, edited by L. Brewer (International Atomic Energy Agency, Vienna, Austria, 1980); and Gokhale et al, J. Phase Equilibria, Vol. 12, p. 493 (1991)]. The possibility of amorphization of part of the silicon was considered, but was eliminated in view of the experimental evidence against it [Koch, personal communication, 1992]. The fine scale of the powder microstructures and the intermetallic compound formation during mechanical alloying suggest a homogeneous distribution of alloying elements. EDS analysis of the powders also revealed the presence of trace amounts of iron impurities that were probably picked up from the hardened steel balls use for milling.

In order to ascertain the effects of carbon additions on the final structure of the MA powders, XRD patterns from the binary and ternary samples after 40 hours of milling were compared. It was determined on the basis of the relative intensities of the molybdenum and $\alpha$-$MoSi_2$ peaks that the formation of $\alpha$-$MoSi_2$ is suppressed by the carbon additions.

B. Phase Evolutions

The phase evolution of the binary and ternary MA $MoSi_2$ powders as a function of temperature was studied by DTA. A typical heating trace of the binary MA $MoSi_2$ powder showed weak exotherms corresponding to 580° C., 780° C. and 1,020° C. The transformations corresponding to these exotherms were studied by XRD analysis of powders heated to temperatures above the end of each exotherm under identical heating conditions (10° C./min. under flowing argon). Comparison of the room temperature and the 690° C. XRD patterns showed that the mild 580° C. exotherm is associated with the formation of more $\alpha$-$MoSi_2$, as is evidenced by the change in the relative intensities of the $\alpha$-$MoSi_2$ and Mo peaks. Likewise, comparison of the 690° C. and 950° C. XRD patterns shows that the 780° C. exotherm corresponds to the simultaneous growth of $\alpha$-$MoSi_2$ and $Mo_5Si_3$ (tetragonal). The 1,020° C. exotherm appears to be associated with the growth of $\alpha$-$MoSi_2$ at the expense of $\beta$-$MoSi_2$ and tetragonal $Mo_5Si_3$. Further heating to higher temperatures [1,300° C.] resulted in a decrease in the amount of $Mo_5Si_3$ due to its transformation to $\alpha$-$MoSi_2$, although minor amounts of the $Mo_5Si_3$ were still apparent.

The DTA trace of the ternary $MoSi_2$ revealed exothermic reactions with peaks at 540° C., 875° C. and 1,030° C. The transformation sequences of these powders were monitored in the same manner as the binary MA $MoSi_2$ powders. Comparison of the room temperature and 750° C. patterns indicates that the mild 540° C. peak corresponds to the partial transformation of molybdenum to $\beta$-$MoSi_2$, while the analysis of the 750° C. and 935° C. patterns suggests that the 875° C. exotherm corresponds to the formation of the carbon-stabilized $C_{<1}Mo_5Si_3$ (Nowotny) phase at the expense of molybdenum. The possibility of this higher molybdenum silicide forming as an oxidation product rather than as a phase transformation product was also considered, but was discounted on the basis of the TGA data which did not show any inflections (due to weight loss or gains that are normally associated with oxidation reactions) at the corresponding exothermic temperature (875° C.). Furthermore, the 1,030° C. exotherm corresponds to the transformation of the Nowotny phase and β-$MoSi_2$ to the more stable α-$MoSi_2$, as evidenced by a comparison of the 935° C. and 1,070° C. XRD patterns. Heating to higher temperatures [1,400° C.] results in a decrease in the amount of the Nowotny phase and an increase in α-$MoSi_2$. The DTA cooling curves of the binary and the ternary powders were flat in nature, thereby indicating stable structures.

The low-temperature formation of the carbon-stabilized Nowotny phase instead of the thermodynamically preferred α-$MoSi_2$ phase is probably related to its greater ease of nucleation and growth. The stability of the β-$MoSi_2$ up to 1,030° C. is also not surprising. Hexagonal β-$MoSi_2$, formed by isothermal annealing of sputtered Mo—Si multilayers, has been reported to be stable up to 800° C. The higher temperature stability of the β phase in this study is probably related to the presence of iron and oxygen impurities rather than the relatively high heating rates of the powders. This is consistent with the experimental evidence obtained from the isothermal annealing of the MA binary and ternary powders (820° C. for a period of 1 hour), which demonstrated the stability of the β-$MoSi_2$ phase.

C. Consolidated Microstructures

Microstructures of a hot-pressed specimen derived from the MA nominally stoichiometric $MoSi_2$ powders showed considerable amounts of second-phase particles with volume fractions of about 0.25 present in the $MoSi_2$ matrix. TEM/EDS analysis of these samples revealed the presence of submicron-sized grains of $MoSi_2$ and second-phase particles which were amorphous and silicon-rich, indicating the presence of a glassy silica phase. The silica was present at the grain boundaries and triple points. In addition, very fine (10 nm) dispersoids were found within the $MoSi_2$ grains, along with occasional grains of $Mo_5Si_3$.

A back-scattered electron image of a hot-pressed specimen derived from the carbon-modified MA $MoSi_2$ powder showed considerable improvement in the overall homogeneity and cleanliness of the microstructure in comparison with the samples derived from the binary MA $MoSi_2$ powder. Based on the atomic number (Z) contrast, it is apparent that the material has three phases.

Following qualitative analysis by EDS, the compositions of each of these phases, as well as the overall matrix composition, were determined by electron microprobe analysis. In addition, quantitative estimation of the volume fraction of these phases was obtained using standard point count techniques. These results are summarized in Table I below. The data indicate the presence of SiC (low Z phase), $MoSi_2$ (intermediate Z phase) and an iron-containing Nowotny phase $C_{<1}(Mo,Fe)_{<5}Si_3$ (high Z phase) in the microstructure, and thus seem to support the isotherms proposed by Nowotny et al, supra, and Brewer et al, supra [see FIG. 1] rather than that of Van Loo et al, supra. Furthermore, the volume fractions of these phases are in reasonable agreement with the location of the nominal compositions in the $MoSi_2$+SiC+$C_{<1}Mo_{<5}Si_3$ three-phase field in the Nowotny diagram. As mentioned hereinabove, the source of the iron is believed to be the hardened steel milling media. Interestingly, no iron was detected in the $MoSi_2$, despite the fact that it has a limited amount of solubility for iron [Raynor et al, Int. Metals Rev., Vol. 30, p. 68 (1985)]. The preferential location of iron in the Nowotny phase is probably related to the greater affinity of iron toward the carbon-centered octahedra of this phase. The relatively small size differences between the atomic radii of Mo and Fe, together with the low levels of the iron impurity, make iron substitution on the molybdenum sites easy, since the resulting lattice strains would be small. It is also apparent that the Nowotny phase tends to adjoin the SiC grains, thereby suggesting that its origin is probably due to local deviations from stoichiometry resulting from either $SiO_2$ or SiC formation.

TABLE I

Microstructural Characteristics of the Consolidated Samples Derived From Ternary MA $MoSi_2$ Powders

| Phase | Composition (atomic %) | | | | Volume Fraction (%) |
| --- | --- | --- | --- | --- | --- |
| | Si | Mo | C | Fe | |
| $MoSi_2$ | 64.55 | 35.45 | — | — | 79.15 |
| SiC | — | 48.29 | 50.20 | — | 11.83 |
| Nowotny | 54.91 | 35.26 | 5.22 | 4.59 | 9.028 |
| Overall | 58.16 | 31.7 | 9.765 | 0.37 | — |
| Initial | 58.00 | 28.00 | 14.00 | — | — |

TEM analysis of the carbon-modified material revealed a homogeneous microstructure with uniformly distributed second phases. The average grain size of the $MoSi_2$ was between 3 and 5 μm, which is much larger than that of the material without carbon. The larger grain size is a temperature-related effect as ternary powder samples consolidated at 1,450° C. exhibited submicron grain sizes. EDS microanalysis, with an ultra-thin polymeric window of one of these phases showed the presence of silicon and carbon alone, indicating that these regions correspond to the dark (low Z) regions. SADP's were obtained along the major zone axes from these and other silicon-rich regions and were consistently indexed to the cubic β-SiC structure (with α=0.4359 nm). The β-SiC was present in the form of 1 μm-sized particles located predominantly along grain boundaries and at triple point regions. Furthermore, the SiC particles were easily distinguishable based on the internal twinning observed. Although the microstructural origin of these SiC particles is presently not well understood, it is probable that their formation would involve the following reactions: (a) carbothermal reduction of silica to SiC, and (b) the cooperative displacements of Si and C from $MoSi_2$ and $C_{<1}Mo_5Si_3$ to form SiC. While the reaction mechanisms for (a) have been discussed [Wei, J. Am. Ceram. Soc., Vol. 66, p. C-111 (1983)], the results of the phase evolution studies on the ternary powders do not indicate the formation of SiC within the limits of detection of the XRD. However, the fact that these studies were conducted on loosely packed powders, at atmospheric pressures under flowing argon, as opposed to the consolidation conditions that involve densely packed powders under highly reducing atmospheres, might have precluded effective conversion of silica to SiC. On the other hand, direct reaction between cooperatively displaced Si and C is also feasible above 1,435° C. based on the DTA data of Singh [presented at the 94th Annual Meeting of the American Ceramic Society, Minneapolis, Minn., 1992]. In addition to β-SiC, grains of the iron-containing Nowotny phase (region B) were also easily distinguishable, based on their lower ion-milling rates. Most importantly, the grain boundaries also appeared to be free of silica, although a small amount was occasionally observed within the grains. Contrary to Maxwell's hypothesis, supra, that molybdenum carbides would be present in the matrix as a reduction product of $MoO_3$ and in accordance with the 1,600° C. isotherms of Nowotny, none of the molybdenum carbides such as MoC and $Mo_2C$ were detected.

D. Thermogravimetric Analysis

The results of the thermogravimetric analysis (heating and cooling rates of 10° K./min.) of the MA binary and ternary powders were compared. While both the samples experienced weight losses above 1,200° C., those exhibited by the C-modified ternary MA $MoSi_2$ powders were much higher than those of the binary MA $MoSi_2$ at all temperatures. Examination of the XRD patterns of the binary MA $MoSi_2$ at temperatures above 1,200° C. revealed minor amounts of tetragonal $Mo_5Si_3$, indicating a silicon-depleted powder. With the knowledge that the oxygen content of micron-sized $MoSi_2$ powders is about 1.5 atomic % [Maxwell, supra], it is quite possible that the weight losses above 1,200° C. are caused by the dissociation of $SiO_2$ (under very low partial pressures of oxygen) to the volatile SiO. On the other hand, the higher weight losses in the C-modified MA $MoSi_2$ powders can be ascribed to the presence of carbon. However, the mechanism in this case is the reduction of $SiO_2$ by carbon to volatile oxides such as CO, $CO_2$ and SiO.

The above data are consistent with the weight losses experienced during the actual hot consolidation of the ternary MA $MoSi_2$ samples. Vacuum hot pressing of the C-modified samples at temperatures of 1,550° C. and below resulted in weight losses near ~4%, while higher consolidation temperatures (1,700° C.) resulted in a near doubling of the weight loss (~8%). However, it should be recognized that the weight losses at temperatures above 1,700° C. are caused by the volatilization of silicon from $MoSi_2$ due to the relatively high vapor pressures of silicon over $MoSi_2$ [Chart, supra; and Searcy, supra], rather than by the carbothermal reduction of the $SiO_2$. This implies that while relatively minor weight losses (up to 5%) due to carbothermal reduction of silica are unavoidable, careful control of the consolidation temperature and vacuum levels can be used to prevent substantial weight losses (~40%), such as those reported in previous studies [Maloy et al, supra].

The ability to form silica-free $MoSi_2$ and $MoSi_2$-based composites containing micron-sized SiC reinforcements opens up exciting avenues of applications. Uniformly dispersed SiC in a modified $MoSi_2$ matrix will lead to considerable elevated temperature strengthening, in addition to improved fracture properties due to the enhanced resistance to grain boundary sliding brought about by the SiC particles dispersed along silica-free grain boundaries.

A processing strategy utilizing carbothermal reduction reactions, mechanical alloying and carbon additions has been provided by the present invention for the synthesis of silica-free $MoSi_2$ and $MoSi_2/SiC$ composites. Using this approach, $MoSi_2$ and $MoSi_2/SiC$ composites have been fabricated starting from pure elemental molybdenum and silicon powders with and without carbon additions. The structural and morphological evolution of the powders has been studied as a function of milling time. It has been shown that complete attrition is achieved after 29 hours of alloying. The resultant powders are micron-sized and contain 4 to 7 nm crystallites of molybdenum, $\alpha$-$MoSi_2$ and traces of $\beta$-$MoSi_2$. The addition of carbon to the starting elemental powder mixture suppresses the formation of $\alpha$-$MoSi_2$ in the fully milled powders. Minor amounts of iron impurities were also found in the powders due to the contamination from the milling media.

The phase evolution studies of the binary and ternary $MoSi_2$ powders indicated that $\beta$-$MoSi_2$ is stable to 1,020° C. at heating rates of 10° C./min., in contrast to previous studies on the isothermal annealing of Mo—Si multilayers which demonstrated stabilities to only 800° C. While minor amounts of tetragonal $Mo_5Si_3$ evolved as an intermediate transformation product in the binary MA $MoSi_2$ powders, the evolution of the ternary $MoSi_2$ powders showed the formation kinetics of the Nowotny phase $C_{<1}Mo_5Si_3$ to dominate that of tetragonal $\alpha$-$MoSi_2$ at lower temperatures. However, temperatures above 1,000° C. resulted in the progressive decrease in the amount of these higher molybdenum phases.

Complete consolidation of the MA powders was achieved at 1,450° C. Amorphous silica that is found in all conventional powder-processed matrixes was essentially eliminated through in situ carbothermal reactions brought about by the additions of carbon through mechanical alloying. It is shown that composites consisting of uniformly distributed micron-sized SiC particles with varying volume fractions can be formed using this approach. Significant grain size differences exist between the microstructures processed from the binary powders and those of the ternary powders, probably due to the higher consolidation temperatures used in the latter. The formation of the iron- and molybdenum-containing Nowotny phase of the approximate composition $C_{<0.5}Mo_{<4.4}Fe_{0.4}Si_3$ is also reported. The co-existence of the Nowotny phase with $MoSi_2$ and SiC is in agreement with the isotherm proposed by Nowotny et al, supra, rather than that proposed by Van Loo et al, supra.

EXAMPLE 2

$MoSi_2/SiC$ (20 v/o)

179.74 grams of silicon (−325 mesh), 252.6 grams of molybdenum (powder size 2–4 μm) and 17.676 grams of carbon (−300 mesh) were mixed in a tumbler mill (low energy mill) for approximately 12 hours. This powder mixture was then subjected to the mechanical alloying process. The mechanical alloying was accomplished in a water-cooled Szegvari attrition mill at 400 rpm under an argon gas atmosphere containing less than 10 ppm oxygen. A slight overpressure of argon was maintained in the attrition chamber to prevent atmospheric air (and hence oxygen) from leaking into the attrition chamber. Hardened steel balls were used as the milling media. The ball-to-powder charge ratio was maintained close to 15:1. The mechanical alloying was carried out for a period of 38.5 hours. The powders were discharged from the mechanical attritor at this time. Subsequently, 60.03 grams of the attrited powder were loaded in a graphite die and subjected to a preload of 5 MPa. This pressure ensured that the open porosity in the compact was sufficient to enable the complete removal of the gaseous by-products of the subsequent deoxidation reaction. The atmosphere surrounding the die was evacuated to a vacuum of $10^{-2}$ Torr or better and the die was heated to 1,500° C. at a rate of 25° C./minute and held at such temperature for a period of approximately 50 minutes to 1 hour in order to deoxidize the sample through the carbothermal reduction reaction. Subsequent to the 1 hour hold period, the hot pressing chamber was back-filled with argon to a pressure of half an atmosphere or more and the temperature of the die was raised to 1,650° C. at a rate of 10° C./minute. The uniaxial pressure on the sample was also simultaneously raised to 40 MPa and maintained at that level. The sample was held at the peak temperature for a period of 1 hour to equilibrate the sample and to fully densify the same. After this hold period, the pressure on the sample was released and the sample was cooled at a rate of 10° C./minute or lower to room temperature. X-ray analysis of the sample revealed tetragonal MoSi$_2$ and SiC as the only phases detected. Back-scattered electron imaging under the scanning electron microscope showed a predominantly two-phase microstructure consisting of MoSi$_2$ and SiC, with the SiC present in volume fractions of approximately 20%. Minor amounts of the ternary Nowotny phase were present, but in volume fractions of less than 1%. A negligible amount of silica (less than 1 volume percent) was observed under polarized light under an optical microscope. The density of the sample, which was measured by the Archimedes method, was found to be 99%.

EXAMPLE 3

MoSi$_2$/SiC (40 v/o)

196.24 grams of silicon (−325 mesh), 220.5 grams of molybdenum (powder size 2–4 μm) and 33.349 grams of carbon (−300 mesh) were mixed in a tumbler mill (low energy mill) for approximately 12 hours. This powder mixture was then subjected to the mechanical alloying process. The mechanical alloying was accomplished in a water-cooled Szegvari attrition mill at 400 rpm under an argon gas atmosphere containing less than 10 ppm oxygen. A slight overpressure of argon was maintained in the attrition chamber to prevent atmospheric air (and hence oxygen) from leaking into the attrition chamber. Hardened steel balls were used as the milling media. The ball-to-powder charge ratio was maintained close to 15:1. The mechanical alloying was carried out for a period of 48 hours. The powders were discharged from the mechanical attritor at this time. Subsequently, 60.07 grams of the attrited powder were loaded in a graphite die and subjected to a preload of 5 MPa. This pressure ensured that the open porosity in the compact was sufficient to enable the complete removal of the gaseous by-products of the subsequent deoxidation reaction. The atmosphere surrounding the die was evacuated to a vacuum of 10$^{-2}$ Torr or better and the die was heated to 1,500° C. at a rate of ~20° C./minute and held at such temperature for a period of approximately 15 minutes to deoxidize the sample through the carbothermal reduction reaction. Subsequent to the hold period, the hot pressing chamber was back-filled with argon to a pressure of half an atmosphere or more and the temperature of the die was raised to 1,650° C. at a rate of 5° C./minute. The uniaxial pressure on the sample was also simultaneously raised to 40 MPa and maintained at that level. The sample was held at the peak temperature for a period of 1 hour to equilibrate the sample and to fully densify the same. After this hold period, the pressure on the sample was released and the sample was cooled at a rate of 10° C./minute or lower to room temperature. X-ray analysis of the sample revealed tetragonal MoSi$_2$ and SiC as the only phases detected. Back-scattered electron imaging under the scanning electron microscope showed a predominantly two-phase microstructure consisting of MoSi$_2$ and SiC, with the SiC present in volume fractions of approximately 40%. Minor amounts of the ternary Nowotny phase were present, but in volume fractions of less than 1%. A negligible amount of silica (less than 1 volume percent) was observed under polarized light under an optical microscope. The density of the sample, which was measured by the Archimedes method, was found to be 98%.

EXAMPLE 4

WSi$_2$/SiC 5.804 grams of tungsten powder (12 μm size), 2.184 grams of silicon (−325 mesh) and 0.192 grams of carbon (−300 mesh) were weighed and loaded along with 3 numbers of ½-inch diameter hardened steel balls as the milling media into a hardened steel vial in an argon atmosphere maintained in a glove box. The vial was sealed from the outside atmosphere by means of a lid with an elastomeric O-ring. The contents of the vial were subjected to high energy attrition in a Spex mill for a period of 48 hours. During the course of the operation, the vial temperature reached about 120° C. The vial was subsequently removed from the mill, allowed to cool to room temperature and reopened inside the glove box.

Subsequently, about 7.5 grams of the attrited powder were loaded in a graphite die and subjected to a hot consolidation cycle. The initial preload on the cold compact was 5 MPa. This pressure ensured that the open porosity in the compact was sufficient for the complete removal of the gaseous by-products of the subsequent deoxidation reaction. The atmosphere surrounding the die was evacuated to a vacuum of 10$^{-2}$ Torr or better and the die was heated to 1,520° C. at a rate of ~15° C./minute and held at such temperature for a period of approximately 30 minutes to 1 hour in order to deoxidize the sample through the carbothermal reduction reaction. Subsequent to the hold period, the hot pressing chamber was back-filled with argon to a pressure of half an atmosphere or more and the temperature of the die was raised to 1,750° C. at a rate of ~10° C./minute. The uniaxial pressure on the sample was also simultaneously raised to 40 MPa and retained at such level. The sample was held at the peak temperature for a period of 1 hour to equilibrate the sample and to fully densify the same. After this hold period, the pressure on the sample was released and the sample was cooled at a rate of 10° C./minute or lower to room temperature. Back-scattered electron imaging under the scanning electron microscope showed a predominantly two-phase microstructure consisting of WSi$_2$ and SiC, with the SiC present in volume fractions of approximately 20%. The SiC was uniformly dispersed throughout the microstructure and varied in size from 1 to 7 μm. Qualitative analysis of the sample by Energy Dispersive Spectrometry revealed that the matrix phase corresponded to WSi$_2$. A negligible amount of silica (less than 1 volume percent) was observed under polarized light under an optical microscope.

EXAMPLE 5

The following example describes the production of a (Mo,W)Si$_2$/SiC alloy silicide composite. The matrix comprises an alloy silicide, (Mo,W)Si$_2$, with MoSi$_2$ and WSi$_2$ present in equimolar quantities (i.e., 50 mol % MoSi$_2$ and 50 mol % WSi$_2$).

2.332 grams of Mo powder (2–4 μm size), 4.378 grams of tungsten powder (12 μm average size), 3.177 grams of silicon (−325 mesh) and 3.13 grams of carbon (−300 mesh) were weighed and loaded along with 3 numbers of ½-inch diameter hardened steel balls as the milling media into a hardened steel vial in an argon atmosphere maintained in a glove box. The vial was sealed from the outside atmosphere by means of a lid with an elastomeric O-ring. The contents of the vial were subjected to high energy attrition in a Spex mill for a period of 48 hours. During the course of the operation, the vial temperature reached about 120° C. The vial was subsequently removed from the mill, allowed to cool to room temperature and was reopened inside the glove box.

Subsequently, about 8.5 grams of the attrited powder were loaded in a graphite die and subjected to a hot consolidation cycle. The initial preload on the cold compact was 5 MPa. This pressure ensured that the open porosity in the compact was sufficient to completely remove the gaseous by-products of the subsequent deoxidation reaction. The atmosphere surrounding the die was evacuated to a vacuum of $10^{-2}$ Torr or more and the die was heated to 1,520° C. at a rate of ~15° C./minute and held at such temperature for a period of approximately 30 minutes to 1 hour in order to deoxidize the sample through the carbothermal reduction reaction. Subsequent to the hold period, the hot pressing chamber was back-filled with argon to a pressure of half an atmosphere or more and the temperature of the die was raised to 1,700° C. at a rate of ~10° C./minute. The uniaxial pressure on the sample was also simultaneously raised to 40 MPa and retained at such level. The sample was held at the peak temperature for a period of 1 hour to equilibrate the sample and to fully densify the same. After this hold period, the pressure on the sample was released and the sampled was cooled at a rate of 10° C./minute or lower to room temperature. Back-scattered electron imaging under the scanning electron microscope showed a predominantly two-phase microstructure consisting of $(Mo,W)Si_2$ and SiC, with the SiC present in volume fractions of approximately 20%. The SiC was uniformly dispersed throughout the microstructure and varied in size from 1 to 7 µm. Quantitative analysis of this sample by microprobe revealed that the matrix phase corresponded to a 50-50 mol % $MoSi_2$—$WSi_2$ alloy. Minor amounts of the ternary Nowotny phase were present, but in volume fractions of less than 1%. A negligible amount of silica (less than 1 volume percent) was observed under polarized light under an optical microscope.

EXAMPLE 6

Hybrid Composite 60 grams of the powder obtained at the end of the mechanical alloying step in Example 2 was blended with 10 grams of chopped niobium wire (diameter 250 µm) and the mixture was consolidated under identical conditions as in Example 2. A hybrid composite consisting of the in situ formed SiC particulate reinforcement and the niobium fiber reinforcement in a $MoSi_2$ matrix was formed.

The products of the invention find utility in structural applications (e.g., aerospace structures such as turbine engines and combustors), as well as high-temperature furnace heating elements for temperatures up to 1,800° C. due to their excellent oxidation resistance, thermal stability and high electrical and thermal conductivity. Fabrication of silica-free, dense, silicide/silicon carbide composites from elemental powders consists of two major steps:

i) preparation of mechanically alloyed powders of the desired composition based on the information from the isotherms; and ii) consolidation of the resultant mechanically alloyed powders through appropriate consolidation processes.

Fabrication of dense, consolidated composite bodies from the mechanically alloyed powders is preferably achieved by hot pressing the powders as follows:

(a) Loading the powders from the mechanical alloying process into an appropriate die material (preferably graphite) and applying a pressure of typically less than 10 MPa on the compact so that the resultant "green body" has sufficient interconnected, i.e., open, porosity.

(b) Heating the "green body" under a vacuum of $10^{-2}$ Torr or better at a rate of between 5° C./min. and 50° C./min. to a temperature between 1,350° C. and 1,500° C.

(c) Holding the sample at the temperature for a time period sufficient to deoxidize the silica and remove the gaseous by-products of the deoxidation reaction. Preferably, the time period of the deoxidation process is between 15 minutes and 1 hour, under a vacuum of $10^{-2}$ Torr or better, in order to deoxidize the silica and remove the gaseous by-products of the deoxidation reaction, such as CO and $CO_2$.

(d) Subsequently increasing the compacting uniaxial pressure to 20–40 MPa so as to eliminate the porosity and densify the sample, while simultaneously bleeding an inert or a reducing gas into the hot pressing chamber so as to eliminate the silicon losses due to volatilization at high temperatures.

(e) Heating the sample to a peak temperature of between 1,600° C. and 1,750° C. at a ramp rate of between 5° C./min. and 50° C./min. and holding the sample at such temperature. The time period of the hold should be sufficient to equilibrate and fully densify the sample. Such densification/equilibration preferably requires a time period of between 15 minutes and 5 hours, under a uniaxial pressure of between 20 and 40 MPa.

(f) Releasing the uniaxial pressure at the end of the hold period and cooling the sample to room temperature, preferably at a rate of less than 10° C./min. so as to minimize the cracking due to thermally induced stresses.

Typical prior art procedures for forming $MoSi_2$/SiC composites involve the addition of carbon to commercial $MoSi_2$ powder. The present invention differs from these methods in several important respects:

(1) The starting (raw) materials used for the fabrication of consolidated bodies is different in the present invention when compared to the earlier publications. The present process utilizes elemental molybdenum, silicon and carbon to synthesize $MoSi_2$, as opposed to the use of commercial $MoSi_2$ powder as the starting material in the prior art.

(2) The method of $MoSi_2$ powder production is entirely different in the present process. The present process utilizes a solid state, high energy attrition process called mechanical alloying to synthesize a mixture of molybdenum and $MoSi_2$ which has unique characteristics. The earlier processes use commercially available powders of the $MoSi_2$ compound.

(3) The present invention differs from the earlier publications regarding the intent of the carbon additions. While the earlier publications intend to utilize the carbon with the sole purpose of deoxidizing the silica in the matrix, the present invention is cognizant of the ternary Mo—Si—C phase diagram data and deliberately uses carbon additions in order to form $MoSi_2$/SiC composites with varying volume fractions of SiC, in addition to deoxidizing and removing the silica.

In accordance with the present invention, the size of the second phase particles may range from 0.1 µm to 10 µm. Larger sized second phase particles may also be produced by varying the hold time and/or hold temperature in step (e) as above.

A wide range of second phase loadings is also possible.

The percentage of the second phase particles can also be varied considerably, depending on the intended application of the final composite material.

It is also possible to form composites containing alloy silicides as matrices with varying amounts of SiC reinforcements. For instance, it is well known that alloy silicides such as (Mo,W)Si$_2$ and (Mo,W)Si$_2$/SiC composites exhibit superior high temperature properties compared to the non-alloyed MoSi$_2$ and MoSi$_2$/SiC composites.

Furthermore, it is also well known that the addition of second phase ceramic particulates or whiskers or fibers improves the short- and long-term strengths of these materials at elevated temperatures.

It is understood that the above description of the present invention is susceptible to considerable modifications or adaptations known to those skilled in the art. Such adaptations are to be considered within the scope of the present invention which is set forth by the appended claims.

For example, the process can be readily adapted to conventional powder metallurgical processes such as extrusion, hot-forming, hot-forging and hot-rolling. Likewise, the powders of the desired compositions as set forth could also be used in conjunction with such processes as plasma spraying.

Likewise, the powders produced by the mechanical alloying process could be used in conjunction with aligned or unaligned fibers and/or whiskers to produce directionally reinforced hybrid composites.

In advanced gas turbine engines, coatings are used to protect engine components from oxidation and hot corrosion. Conventionally, these coatings are physical vapor deposited onto the component. The component life can be limited by the life of the coating. For components subjected to high temperature, spalling of the coating due to the differences in the coefficient of thermal expansion (CTE) between the component and the coating occurs during repeated thermal cycling. Coatings derived by plasma spraying of the mechanically alloyed powders with nominal compositions located along various points on segment A enables the tailoring of the overall CTE of the coatings by controlling the relative amount of MoSi$_2$ and SiC.

An approach to limit these failure mechanisms is to vary the CTE of the coating by varying the MoSi$_2$ and SiC content in the coating. This is, in turn, controlled by the overall composition of the powders derived from mechanical alloying. Low pressure plasma spraying of the mechanical alloyed powder coating on the component could achieve this objective.

It is to be noted that silicides and silicon carbide possess excellent resistance to oxidation, especially at high temperatures, i.e., above 1,000° C.

The present invention provides the following advantages over the prior art:

(1) Greater degree of process control: The present process allowed for a greater degree of control compared to the previous processes in terms of controlling the overall stoichiometry of the powder. This is illustrated in FIG. 1 where the additions of carbon to commercial MoSi$_2$ as in the prior art shifts the overall composition along line 1 as indicated. As can be seen, increasing carbon additions to commercial MoSi$_2$ powders (prior art), while leading to SiC formation, also leads to considerable CMo$_5$Si$_3$ formation due to the nature of the process. Thus, a true MoSi$_2$/SiC composite cannot be obtained in the prior art. On the other hand, the utilization of the mechanical alloying process enables the individual control of the Mo, Si and C additions and thus makes it possible to tailor the overall composition so that it lies close to the tie line connecting MoSi$_2$ and SiC. This allows the production of MoSi$_2$/SiC composite with a minimal amount of CMo$_5$Si$_3$.

(2) Increased homogeneity in the SiC distribution: The mechanical alloying process of the present invention results in the distribution of the alloying elements on a fine scale (~10 nm). Consequently, this results in a uniform distribution of the SiC particles in the MoSi$_2$ matrix. On the other hand, the microstructures obtained through the addition of carbon in the prior art are not as homogeneous as in the present process in terms of the SiC size and distribution due to the coarser scale of mixing in those processes.

(3) Lower consolidation temperatures: The powders produced by mechanical alloying are extremely fine (~1 μm size). It is well known that such fine powders are capable of being densified at a much lower temperature than coarser powders. Consequently, with all other process parameters being constant, mechanically alloyed powders would have a consolidation temperature at least 100° C. lower than those of commercially derived powders with larger powder sizes. This should result in substantial savings in the processing costs of these materials.

(4) More effective elimination of silicas: The present invention eliminates silica from the matrix more effectively than in the prior art. The unique nature of the current process enables a very uniform distribution of carbon and, hence, very efficient deoxidation of silica in the matrix.

We claim:

1. A method for forming a substantially silica-free composition of matter comprising a matrix substance comprising MoSi$_2$ having SiC dispersed therein, said method comprising consolidating a substantially silica-free composite mechanical alloy powder comprising MoSi$_2$ and SiC having a composition close to the MoSi$_2$/SiC tie line, but which is slightly molybdenum rich, said method of consolidation comprising two stages I and II:

I.
   a) compacting said powder under pressure sufficient to form the powder into a compacted shape, said pressure enabling the maintenance of open porosity substantially throughout said compact;
   b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in significant volatilization and loss of silicon from said compact; and II. consolidating the resulting compact by heating the compact under pressure, the time and temperature of heating and condition of pressure being sufficient to densify said compact while avoiding losses of silicon therefrom by volatilization.

2. The method of claim 1 including the step of forming said substantially silica-free composite powder by providing particles of molybdenum, silicon and carbon in a proportion relative to each other required to produce a composite powder of MoSi$_2$ and SiC having a composition close to the MoSi$_2$/SiC tie line, but which is slightly molybdenum rich, and subjecting said particles to mechanical alloying under conditions and for a time sufficient to produce said composite powder.

3. The method of claim 1 wherein said powder is compacted in stage I. a) under a pressure of less than about 10 MPa.

4. The method of claim 1 wherein said compacted powder is heated in stage I. b) at a temperature of between about 1350° C. and 1500° C.

5. The method of claim 1 wherein said compacted powder is heated in stage I. b) under a vacuum of $10^{-2}$ Torr or better.

6. The method of claim 1 wherein said deoxidized compacted powder produced in stage I is consolidated in stage II at a temperature between about 1600° C. and 1750° C.

7. The method of claim 1 wherein said deoxidized compacted powder produced in stage I is consolidated in stage II by heating under a pressure between about 20 and 40 MPa.

8. The method of claim 1 wherein said consolidation of said deoxidized compacted powder in stage II is carried out in an inert atmosphere.

9. The method of claim 1 including the step of cooling and recovering the cooled consolidated product.

10. The composition of matter formed by the method of claim 1.

11. An article of manufacture comprising the composition of matter of claim 10.

12. A substantially silica-free composite mechanical alloy powder comprising $MoSi_2$ and SiC having a composition in that segment of the ternary diagram of FIG. 1 designated A.

* * * * *